Nov. 29, 1960  F. E. OBERMAIER  2,962,047
CHECK VALVE
Filed Feb. 23, 1956
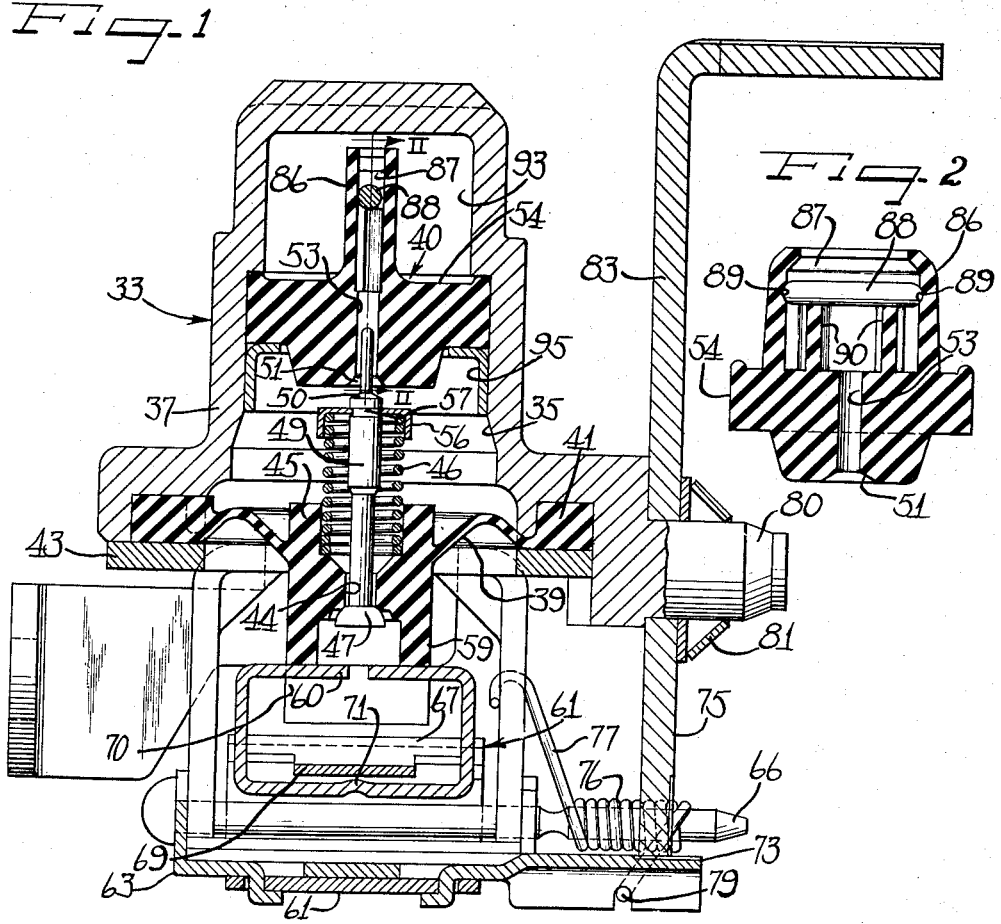
Inventor
Frank E. Obermaier
by Hill, Sherman, Meroni, Gross & Simpson
Attys

United States Patent Office 2,962,047
Patented Nov. 29, 1960

2,962,047

CHECK VALVE

Frank E. Obermaier, Oak Park, Ill., assignor to The Dole Valve Company, Chicago, Ill., a corporation of Illinois Filed Feb. 23, 1956, Ser. No. 567,126

2 Claims. (Cl. 137—525)

This invention relates to improvements in check valves and more particularly relates to an improved form of vacuum control check valve.

A principal object of the invention is to provide an improved form of check valve controlling the flow of vacuum from a vacuum output to a vacuum input and preventing the backflow from the input to the output when vacuum at the output is greater than that at the input.

A further object of the invention is to improve upon the check valves heretofore known, by providing a resilient valve placed under slight tension by a rigid member and operating on the principle of flexing the valve toward and from the rigid member upon differences in vacuum at the vacuum input and the vacuum output.

These and other objects of the invention will appear from time to time as the following specification proceeds and with reference to the accompanying drawings wherein:

Figure 1 is a transverse sectional view taken through a temperature responsive vacuum control valve and showing a check valve constructed in accordance with the invention in transverse section; and Figure 2 is a longitudinal sectional view taken through the check valve shown in Figure 1, substantially along line II—II of Figure 1.

In the embodiment of the invention illustrated in the drawing, I have shown a vacuum control valve 33 comprising a valve casing 37 containing a vacuum equalizing or output chamber 35 connected with a vacuum output, which may have connection with a device to be operated by vacuum. The vacuum equalizing or output chamber 35 is defined at one end by a flexible diaphragm 39 and at its opposite end by a check valve 40 operative to prevent the backflow of vacuum from a vacuum input 93, connected to a source of vacuum, to the vacuum equalizing or output chamber 35 when vacuum in the vacuum input is lower than vacuum in the vacuum output.

The diaphragm 39 of the vacum control valve 33 has an annular rib 41 recessed within the bottom wall of the casing 37 and sealed thereto as by a retainer yoke 43 generally annular in form and extending about said diaphragm 39 in registry with the rib 41 and crimped or otherwise secured to the valve casing 37. The diaphragm 39 has a central thickened portion having a port 44 leading therethrough concentric with the center thereof, and having an inwardly extending annular wall 45 encircling the port 44 and forming a seat for a spring 46, biasing a valve 47 into engagement with the end of the port 44. The valve 47 is on the lower or outer end of a stem 49 passing through the port 44. A valve 50 is formed at the opposite end of the stem 49 from the valve 47. The valve 50 is engageable with a port 51 communicating with a passageway 53 leading through a body 54 for the check valve 40 upon balanced vacuum conditions within the vacuum chamber 35. The spring 46 is seated at its end opposite the diaphragm 39 on a flanged retainer 56, snapped or otherwise secured to a recessed portion 57 of the stem 49.

The diaphragm 39 also has an annular wall 59 extending outwardly therefrom and abutting the spaced adjacent ends of a yoke 60, operated by a generally U-shaped bi-metal thermal element 61. The annular wall 59 has spaced nibs 70 extending outwardly therefrom through suitable apertured portions (not shown) of the yoke 60, for securing said diaphragm to said yoke. The adjacent ends of the yoke 60 are spaced with respect to each other to form a stop for the valve 47 and to accommodate the passage of air into the vacuum chamber 35 upon opening of said valve.

The bi-metal thermal element 61 has a bracket member 63 secured to the inner side of an outer leg 64 thereof. The bracket member 63 extends inwardly along the leg 64 toward the base of the thermal element and is pivotally connected between spaced ears 65 extending outwardly from the yoke 43, on a pivot pin 66. The ears 65 locate the pivot pin 66 intermediate the ends of the bi-metal thermal element 61 and between the outer leg 64 of said thermal element and an inner leg 67 thereof. The inner leg 67 has a reduced cross-sectional area end portion 69 extending within the yoke 60.

The bi-metal thermal element 61 is formed with its high expanding side on the inside of the element. Thus, upon increases in temperature the inner leg 67 will move toward the diaphragm 39 away from the yoke 60 into engagement with the nibs 70 extending from the annular wall 59 through the yoke 60. Further increases in temperature will then move the diaphragm 39 inwardly of the vacuum chamber 35 to open said chamber to air at atmospheric pressure through the port 44, and to close the valve 50.

The bracket member 63 has an arm 73 extending outwardly therefrom into engagement with a camming face of a control cam 75. A torsion spring 76 on the pin 66 has one arm 77 connected with the ear 65 and another arm 79 engaging the bracket member 63, and biasing the arm 73 of said bracket member into engagement with the camming face of the control cam 75. The cam 75 is pivotally mounted on a pivot pin 80 extending outwardly from the casing 37, and is suitably retained thereto as by a spring washer 81. An arm 83, herein shown as being formed integral with the cam member 75, extends from the pivot pin 80 in an opposite direction from the camming face 74 and may be connected to a suitable actuator for adjusting the position of the cam member 75 and the operating temperature range of the bi-metal thermal element, and for holding said cam member in its adjusted positions.

A stop (not shown) extends inwardly of the thermal element 61 and has engagement with the reduced cross-sectional area end portion 69 thereof to maintain tension on said thermal element in accordance with the position of the cam 75 and thus vary the temperature range of operation of the valve.

For example, if the cam member 75 is moved in a counterclockwise direction, the force against which the leg 67 of the bi-metal thermal element 61 bears against the stop (not shown) will be increased, and the diaphragm 39 will be retained in its extended position with the valve 47 closed and the valve 50 opened. It will thus take a relatively large force and large amount of movement of the leg 67 of the bi-metal thermal element 61 to move the diaphragm 39 inwardly to unseat the valve 47. The temperature at which bi-metal thermal element 61 operates to reduce the vacuum in the vacuum chamber 35 will thus be at a maximum.

In a contrary manner, as the cam member 75 is moved in a clockwise direction, the tension of the bi-metal thermal element 61 and the force exerted by said thermal element against the stop (not shown) will be decreased, resulting in a shorter travel of said thermal element to unseat the valve 49 and reduce the vacuum in the vacuum chamber 35. This will lower the temperature range at which the thermal element 61 operates to unseat the valve 47 to admit air at atmospheric pressure to the chamber 35 and lower the vacuum at the vacuum output.

The check valve 40 includes the valve body 54 which may be made of rubber or one of the well known substitutes for rubber. The valve body 54 has an elongated passageway member 86 extending from the opposite side thereof from the valve 50. The passageway member 86 has an elongated passageway 87 therein in communication with the passageway 53 and in direct alignment therewith. The passageway 87 has a pin 88 extending therealong and with the inner walls of said passageway forming the check valve. The pin 88 has opposite rounded ends 89 engaging opposite ends of the passageway 87 and slightly stretching said passageway. Stops 90 extend inwardly from the bottom of the passageway 87 to retain the pin 88 in position within said passageway. The walls of the passageway 87 yieldably engaging the pin 88 will spread apart to accommodate the withdrawal of air from the vacuum chamber 35 when the suction in the vacuum input 93 on the outer side of the check valve body 54 is greater than the vacuum in the chamber or output 35.

When, however, the vacuum in the input 93 is less than the vacuum in the vacuum chamber or output 35 the increased pressure on the outer wall of the elongated passageway member 86 in the input 93 will force the wall of the passageway member 86 into engagement with the pin 88 and hold vacuum within the chamber or output 35.

An annular shouldered retainer 95 is pressed within the vacuum chamber 35 into engagement with the valve body 54 to retain and seal said valve body to the wall of the chamber 35.

In operation of the device and assuming the input 93 is connected to an intake manifold 96 of an internal combustion engine of an automotive vehicle and that the vacuum control valve 33 is within the passenger compartment of the vehicle while the vacuum output 35 is connected with a uniform rate of flow valve (not shown), controlling the rate of flow of hot water to an automobile heater (not shown), and assuming the engine is running and the suction in the intake manifold of the engine becomes greater than the vacuum in a vacuum control chamber or output 35, the walls of the passageway member 87 will flex away from the pin 88 and the check valve 40 will be in its open position.

If the temperature in the passenger compartment of the automotive vehicle rises to the setting of the bi-metal thermal element 61, said bi-metal element will move toward the chamber 35 and accommodate the diaphragm 39 to move inwardly with respect to said chamber and open the valve 47 to admit air at atmospheric pressure into the vacuum chamber or output 35, and thus reduce the vacuum at the vacuum output.

When, however, the temperature within the car body is reduced to a point where it is necessary to supply heat to the car heater, the bi-metal thermal element 61 will be moved by the torsion spring 76 to engage the leg 67 thereof with the stop 85. This will effect the closing of the valve 47 and opening of the valve 50 to increase the vacuum in the vacuum chamber or output 35.

The vacuum chamber 35 thus balances the pressure differential across the diaphragm against the pressure exerted against said diaphragm in an outward direction by the bi-metal thermal element 61 while the check valve 40 is operated by the differential in pressure between the vacuum input and the vacuum output to prevent the backflow of air from the vacuum input to the vacuum output when the vacuum in the vacuum output is greater than the vacuum at the vacuum input.

I claim as my invention:

1. In a check valve, a valve casing, a vacuum input leading from said valve casing, a vacuum input chamber within said valve casing in communication with said vacuum input, a vacuum output leading to said valve casing, a resilient valve body separating said vacuum input chamber from said vacuum output, said valve body having a generally cylindrical body portion sealed to the wall of said casing, having a port at one end thereof, in communication with said vacuum output and a passageway leading axially from said port through said cylindrical body portion, and also having a wall portion of generally oval cross-section surrounding said passageway and extending from said body portion into said vacuum input chamber, the inner margins of which wall portion define a passageway generally oval in cross-section leading from said first mentioned passageway to said vacuum input chamber, an elongated member extending across said oval-shaped passageway and engaging the ends thereof and placing said passageway under slight tension, stop means within said oval-shaped passageway extending from said body portion on opposite sides of said first mentioned passageway and engaging said elongated member and maintaining said elongated member in position within said oval-shaped passageway, said wall portion being stretched away from the sides of said elongated member when vacuum in said vacuum input chamber exceeds the vacuum in said vacuum output, to accommodate the flow from said vacuum output to said vacuum input chamber, and said wall portion being compressed against the sides of said elongated member between the ends thereof as vacuum in said vacuum output exceeds the vacuum in said vacuum input chamber, to prevent the flow from said vacuum input chamber to said vacuum output.

2. A device in accordance with claim 1 wherein the stop means comprises spaced lugs formed integrally with said body portion on opposite sides of said first mentioned passageway and extending along said oval-shaped passageway into engagement with said elongated member.

References Cited in the file of this patent

UNITED STATES PATENTS

| | | |
|---|---|---|
| 605,693 | Black | June 14, 1898 |
| 1,764,799 | Kysor | June 17, 1930 |
| 2,270,332 | Osborn | Jan. 20, 1942 |
| 2,328,805 | Holthouse | Sept. 7, 1943 |
| 2,421,565 | Klug | June 3, 1947 |
| 2,486,573 | Pravda | Nov. 1, 1949 |
| 2,554,489 | Crane | May 29, 1951 |
| 2,668,014 | Lund | Feb. 2, 1954 |
| 2,672,293 | Ludlow | Mar. 16, 1954 |
| 2,684,081 | Chace | July 20, 1954 |
| 2,725,883 | Ward | Dec. 6, 1955 |
| 2,728,338 | Force | Dec. 27, 1955 |
| 2,743,872 | Wood et al. | May 1, 1956 |